(12) United States Patent
Yonnet

(10) Patent No.: US 6,935,362 B1
(45) Date of Patent: Aug. 30, 2005

(54) PILOT VALVE

(75) Inventor: Claude Yonnet, Matlock (GB)

(73) Assignee: Technolog Limited, Matlock (GB)

( * ) Notice: Subject to any disclaimer, the term of this patent is extended or adjusted under 35 U.S.C. 154(b) by 0 days.

(21) Appl. No.: 09/980,431

(22) PCT Filed: Jun. 2, 2000

(86) PCT No.: PCT/GB00/02127

§ 371 (c)(1),
(2), (4) Date: Mar. 27, 2002

(87) PCT Pub. No.: WO00/75741

PCT Pub. Date: Dec. 14, 2000

(30) Foreign Application Priority Data

Jun. 4, 1999 (GB) .................................. 9913058

(51) Int. Cl.⁷ ........................ G05D 16/18; G05D 16/06
(52) U.S. Cl. ............ 137/489; 137/505.14; 137/505.41
(58) Field of Search .................. 137/489, 489.5, 137/494, 495, 505.14, 505.18, 505.41, 488

(56) References Cited

U.S. PATENT DOCUMENTS

| | | | | |
|---|---|---|---|---|
| 3,103,232 A | * | 9/1963 | Ritter et al. ............. 137/489.5 |
| 3,592,223 A | * | 7/1971 | Reese ....................... 137/469 |
| 3,807,439 A | * | 4/1974 | Doe .......................... 137/489.5 |
| 4,026,513 A | * | 5/1977 | Callenberg ................ 137/489 |
| 4,200,911 A | * | 4/1980 | Matsumoto ................. 700/28 |
| 4,267,855 A |   | 5/1981 | Bradshaw |
| 4,966,188 A |   | 10/1990 | Fischer et al. ............. 137/489 |
| 5,016,665 A | * | 5/1991 | Konieczynski ............. 137/1 |
| 5,063,956 A | * | 11/1991 | Borcuch et al. ............ 137/489 |
| 5,460,196 A | * | 10/1995 | Yonnet ..................... 137/489.5 |
| 5,694,975 A | * | 12/1997 | Eidsmore ................... 137/489.5 |
| 5,816,286 A | * | 10/1998 | Scott et al. ................. 137/489 |
| 5,967,176 A | * | 10/1999 | Blann et al. .............. 137/489.5 |
| 6,240,956 B1 | * | 6/2001 | Johnson ..................... 137/505 |

FOREIGN PATENT DOCUMENTS

| | | | | |
|---|---|---|---|---|
| DE | 3741364 A1 | 6/1989 | ........... F15B 3/00 |
| EP | 0 081 229 | * | 6/1983 |
| FR | 1.582.851 | 10/1969 |
| GB | 673787 | 10/1950 |
| GB | 2284687 A | 6/1995 | ......... G05D 16/16 |

OTHER PUBLICATIONS

Automatischer Duerchflussregler, Technische Rundschau, vol. 62, No. 44, Oct. 16, 1970.

* cited by examiner

*Primary Examiner*—Ramesh Krishnamurthy
(74) *Attorney, Agent, or Firm*—Head, Johnson & Kachigian

(57) ABSTRACT

There is provided a pilot valve (50), suitable for use in water and gas supply systems, the valve including biassing means (57), to control a gate (55), for controlling fluid flow through a control chamber (51), and a second chamber (52), which is sealed by a diaphragm (53), the second chamber (52), in use, receiving a control pressure for controlling the operation of the gate (55), such that an increase in control pressure acts to reduce fluid flow through the gate (55). The side of the diaphragm (53), against which the control pressure is not applied, is in fluid communication with the control chamber (51).

20 Claims, 5 Drawing Sheets

PILOT VALVE

CROSS-REFERENCE TO RELATED APPLICATION

This application claims priority to PCT Application No. PCT/GB00/02127 filed 2 Jun. 2000, which claims priority to British Application No. 9913058.5 filed 4 Jun. 1999.

BACKGROUND OF THE INVENTION

The present invention relates to a pilot valve, for example of the type which is commonly used to control a pressure reducing valve in water and gas supply systems.

FIG. 1 illustrates the use of a "single chamber" pilot valve 1 to control a pressure reducing valve (PRV—shown schematically as item 2) as commonly used in a water supply system. In the context of a gas supply system such a pressure reducing valve is normally known as a "regulator" or "governor", but herein the single term "PRV" is used for simplicity as referring to both types of system. The fluid to be controlled (usually water or gas, and in this example will be taken to be water) flows along the main pipe 3 through the PRV. The outlet pressure (Po) is usually less than the inlet pressure (Pi) due to the action of the PRV.

The amount of pressure reduction is controlled by operation of the PRV under control of pilot valve 1. An auxiliary flow pipe 4 carries water from the inlet of the PRV to the control chamber 5 of the pilot valve 1 and then back to the outlet of the PRV. Prior to entering the control chamber 5, the water passes through a venturi chamber (or primary orifice) 6 or, more correctly in the context of a gas supply system, an inspirator 6 and the water pressure (Pv) at the outlet side 7 of the chamber or inspirator controls the PRV.

The flow of water through the control chamber 5 is controlled by a gate mechanism 8 which is linked to a diaphragm 9. A spring 10 applies force to the rear of the diaphragm 9 and the amount of force supplied by the spring may be varied by an adjustment screw 11.

In a steady state situation (where Po remains constant) the water pressure in the control chamber 5 will be balanced by the force generated the spring and the gate 8 will remain in a constant position. Thus the flow through the auxiliary pipe 4 will remain constant and PV will remain constant.

If the control pressure (Po) falls, the spring 10 causes the gate 8 to open further and the flow through the auxiliary pipe increases. Accordingly, the flow through the venturi 6 also increases which results in pressure Pv decreasing, causing the PRV to open further. This results in the control pressure Po rising again and the system should then reach a steady state again at the previously set value of Po.

In order to provide an improved control system, the present applicant has already disclosed a system which uses a "dual chamber" pilot valve in European Patent No. 574241. FIG. 2 shows an example of a system utilising a "sandwich plate" dual chamber pilot 20. The pilot valve 20 performs the same general function in the control system as the pilot valve of FIG. 1 but in this example the adjustment previously provided by adjustment screw 11 is effectively supplemented by an adjustment using a control pressure (Pc). As further relevant background art may be mentioned the gas supply pressure control apparatus as disclosed by the present applicant in GB-A-2252848.

The pilot valve 20 includes a second chamber 21 which is effectively divided into two portions 22 and 23 by a wall 24. The control pressure Pc effectively acts against the force of spring 10 by virtue of diaphragm 26. As with FIG. 1, the spring is mechanically connected by arm 28 to a gate mechanism 8 which performs the same function as previously. The arm 28 passes through wall 24 and the aperture through which it passes is sealed by a seal 29 so that chamber 23 does not contain any water but instead is vented to the atmosphere.

If the control pressure Pc remains constant, then the system operates as explained with reference to FIG. 1. However, if the control pressure Pc is reduced then the gate 8 will open further thereby reducing pressure Pv and increasing the outlet pressure Po. This is usually referred to as a "failsafe" system since in the event that the control pressure fails i.e. falls to zero, the outlet pressure Po will be set to its maximum value.

FIG. 3 illustrates an alternative but mechanically equivalent "dual chamber" pilot valve arrangement to that shown in FIG. 2. The arrangement of FIG. 3 is sometimes referred to as a "pancake adapted" pilot. In this arrangement, the second chamber 31 is located at the base of the pilot 30. As with the arrangement of FIG. 2, the second chamber 31 is divided by a diaphragm 34 into two chambers 32 and 33 and the control pressure Pc is applied to chamber 32. The diaphragm 34 is mechanically linked via an arm 35 to the gate mechanism 8 but is not rigidly limited to the gate or spring. The arm 35 presses into control chamber 5 via an aperture which is again sealed with seal 36.

In the embodiment of FIG. 3, the control pressure Pc again opposes the force produced by the spring 10 and so the control system effectively operates in an identical manner. In other words, if control pressure Pc is reduced then the outlet pressure Po is increased.

One advantage over the FIG. 3 arrangement as opposed to the FIG. 2 arrangement is that the additional chamber 31 can effectively be retrofitted to a single chamber pilot valve. However one disadvantage with the dual chamber pilot valves of FIGS. 2 and 3 is that in both cases a seal needs to be provided in order that the control fluid is prevented from entering the second part of the additional chamber i.e. that part of the chamber to which the control pressure is not applied. The provision of such a seal can be difficult and deterioration or failure of the seal may lead to reduction in performance of the pilot valve or leakage therefrom. Furthermore, the friction caused by the seal can in turn create a frictional error in the quality of the pilot valve control.

FIG. 4 shows a further "hydraulic" dual chamber pilot valve arrangement. As with the previous embodiments, a second chamber 40 is provided which is divided by a diaphragm 41 into two parts 42 and 43. The control pressure Pc is applied to part 42 of the second chamber 40 and part 43 is connected to the spring chamber which is vented to the atmosphere. As before, the diaphragm 41 is mechanically connected to the gate 8, in this case via the spring 10.

However, unlike the embodiments of FIG. 2 and FIG. 3 in the embodiment of FIG. 4 the control pressure Pc acts in the same direction as the force of the spring 10, rather than against it. This means that the control system works in the opposite way to that of FIGS. 2 and 3 i.e. if the control pressure Pc is reduced then the gate 8 closes further, the venturi pressure Pv increases causing the PRV to close further and the outlet pressure to drop. This arrangement is not considered to be "failsafe" since a loss of control pressure Pc would result in the lowest possible outlet pressure Po. This is sometimes referred to as a "direct acting" control system rather than the "reverse acting" control systems of FIGS. 2 and 3.

The present invention aims to provide a pilot valve of the "reverse acting" type but which eliminates the need for a seal.

SUMMARY OF THE INVENTION

In a first aspect, the present invention provides a pilot valve which includes
- biasing means to control a gate for controlling fluid flow through a control chamber;
- a second chamber sealed by a second chamber diaphragm into which control pressure is appliable for also controlling the operation of the gate, whereby in use an increase in control pressure acts to reduce fluid flow through the gate;
- wherein the side of the diaphragm against which the control pressure is not applied is in fluid communication with the control chamber.

In this way, a "reverse acting" dual chamber pilot valve is provided in which the need for any seal in association with the second chamber is avoided.

The fluid which in use flows through the control chamber may or may not be the same fluid or type of fluid as the fluid which in use is used to apply the control pressure. The fluids in question may, for example, be water or gas. In other words, in one example both fluids in question may be water; in another example both fluids may be gas; in a third example one fluid may be water and the other gas.

Preferably, the biassing means is a spring means or spring such as a helical spring. Preferably the biassing means is biassed to open the gate and may be rigidly connected to the gate by a suitable mechanical linkage. Preferably the diaphragm is also rigidly connected to the gate and/or biassing means via the same or a second suitable mechanical linkage.

Preferably, the control chamber is at least partly bounded by a control chamber diaphragm in addition to the second chamber diaphragm. Preferably biassing means is located on the opposite side of the control chamber diaphragm to the control chamber. As will be explained in detail later in the specification, by appropriately selecting the areas of the second chamber diaphragm and the control chamber diaphragm, the effect of the control pressure on the fluid flow through the control chamber (and therefore in use, on the outlet pressure) can be selected.

In a preferred embodiment, the ratio of the area of the control chamber diaphragm to the second chamber diaphragm is 2:1 or less. For example, if the control chamber diaphragm is twice the area of the second chamber diaphragm then a particular drop in control pressure will result in an identical increase in outlet pressure. In a different example, if the area of the second chamber diaphragm is three-quarters that of the control chamber diaphragm then an increase in control pressure of a given amount would cause the outlet pressure to decrease by three times that amount. The particular case in which the second chamber diaphragm area is half that of the control chamber diaphragm effectively replicates the function of the "sandwich" and "pancake" arrangements described earlier with reference to FIGS. 2 and 3.

Embodiments of the present invention will now be described by way of example with reference to the accompanying drawings in which:

DESCRIPTION OF THE PREFERRED EMBODIMENTS

Figure 1:
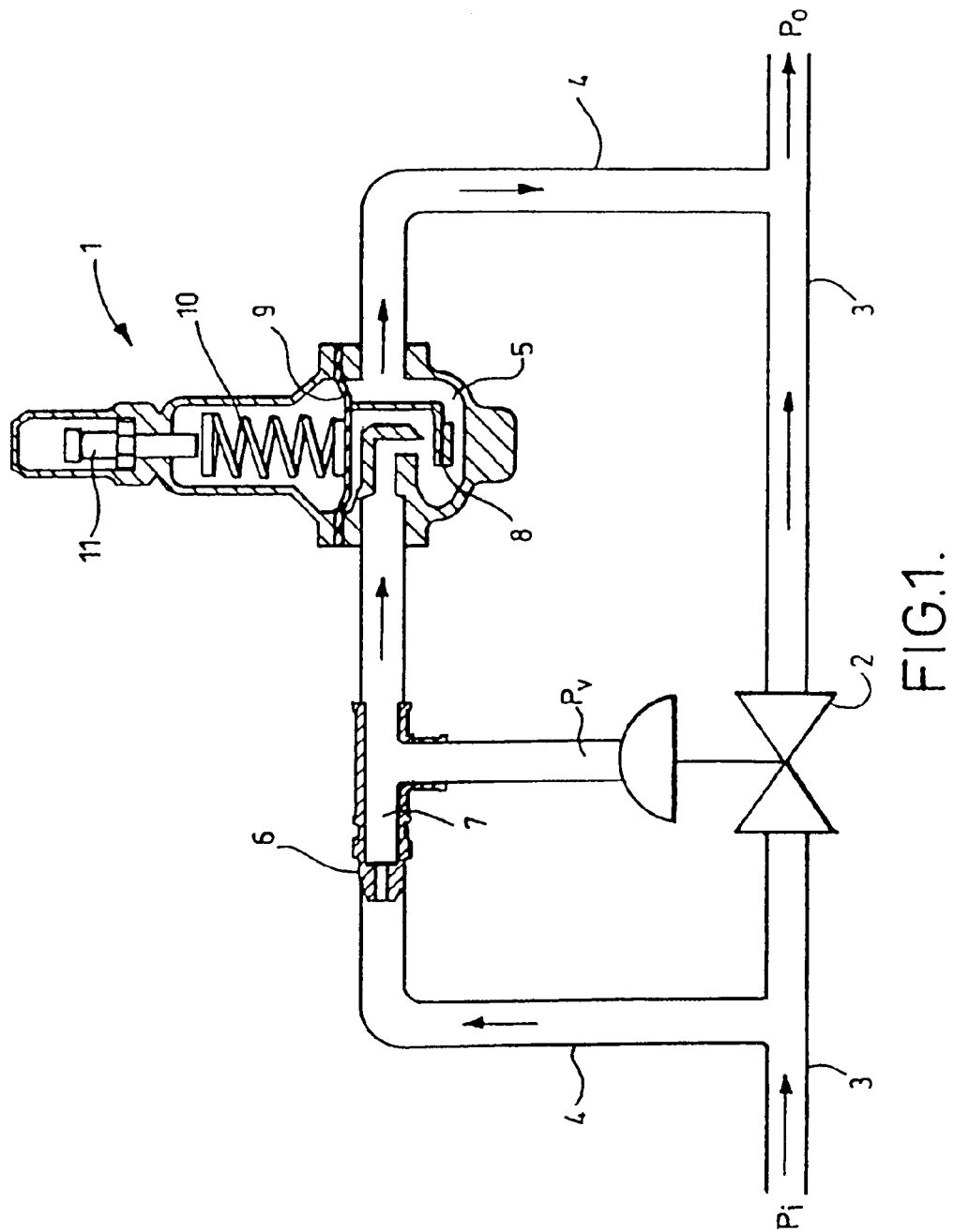
FIG. 1 is a schematic diagram of a single chamber pilot valve control arrangement.
Figure 2:
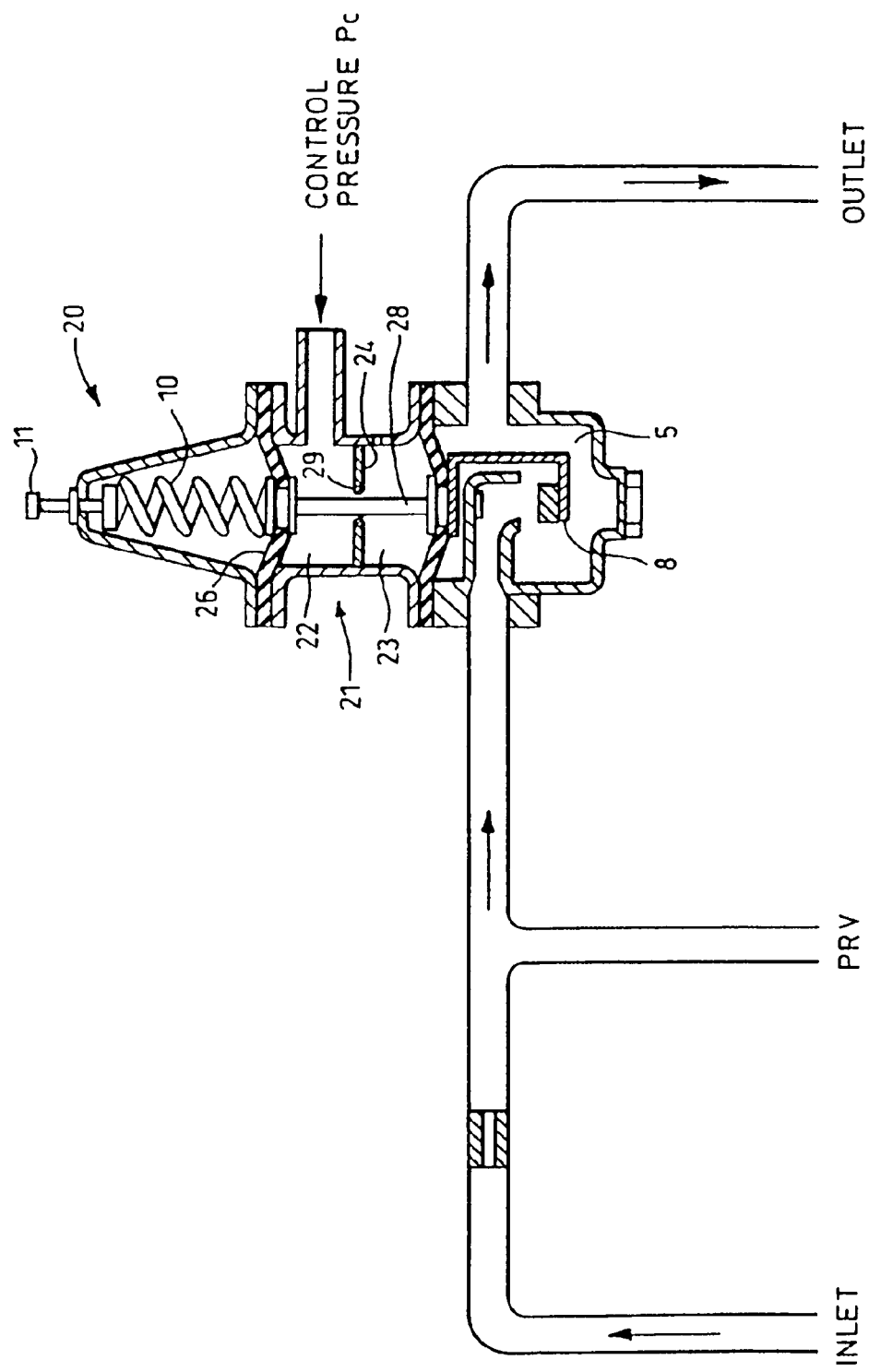
FIG. 2 is a schematic diagram of a "sandwich" dual chamber pilot valve arrangement.
Figure 3:
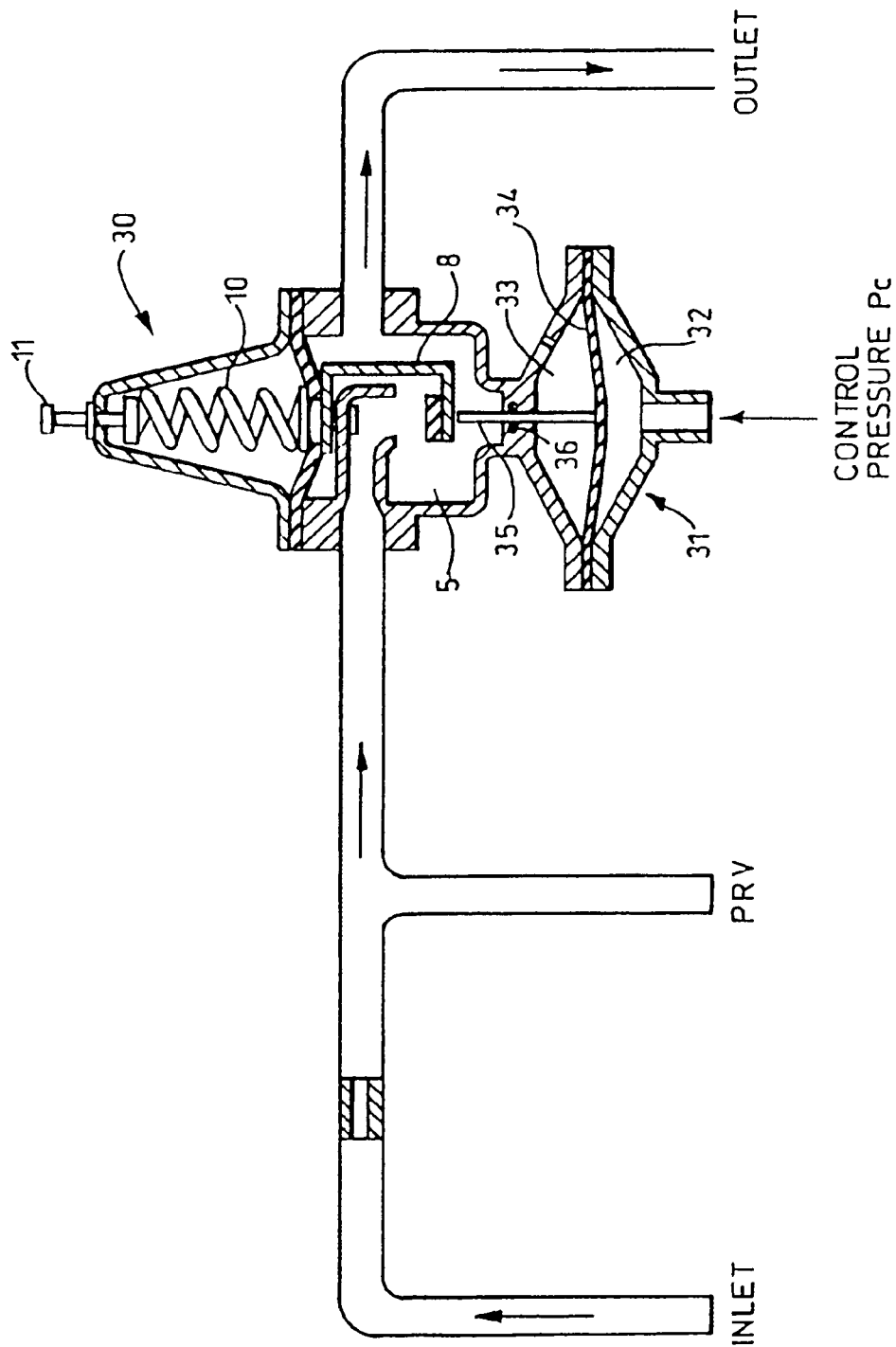
FIG. 3 is a schematic diagram of a "pancake" dual chamber pilot valve arrangement.
Figure 4:
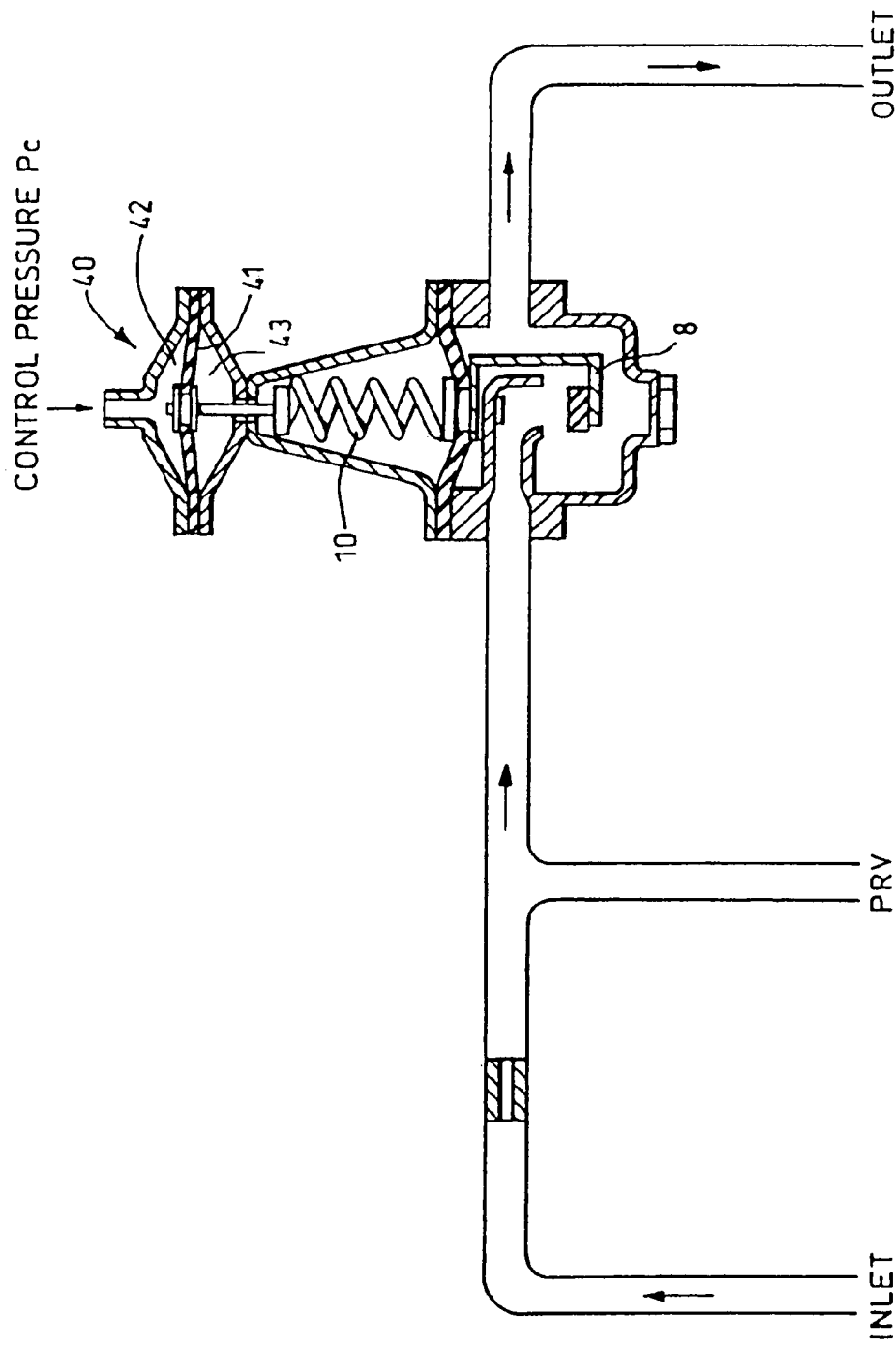
FIG. 4 is a schematic diagram of a "hydraulic" dual chamber pilot valve arrangement.
Figure 5:
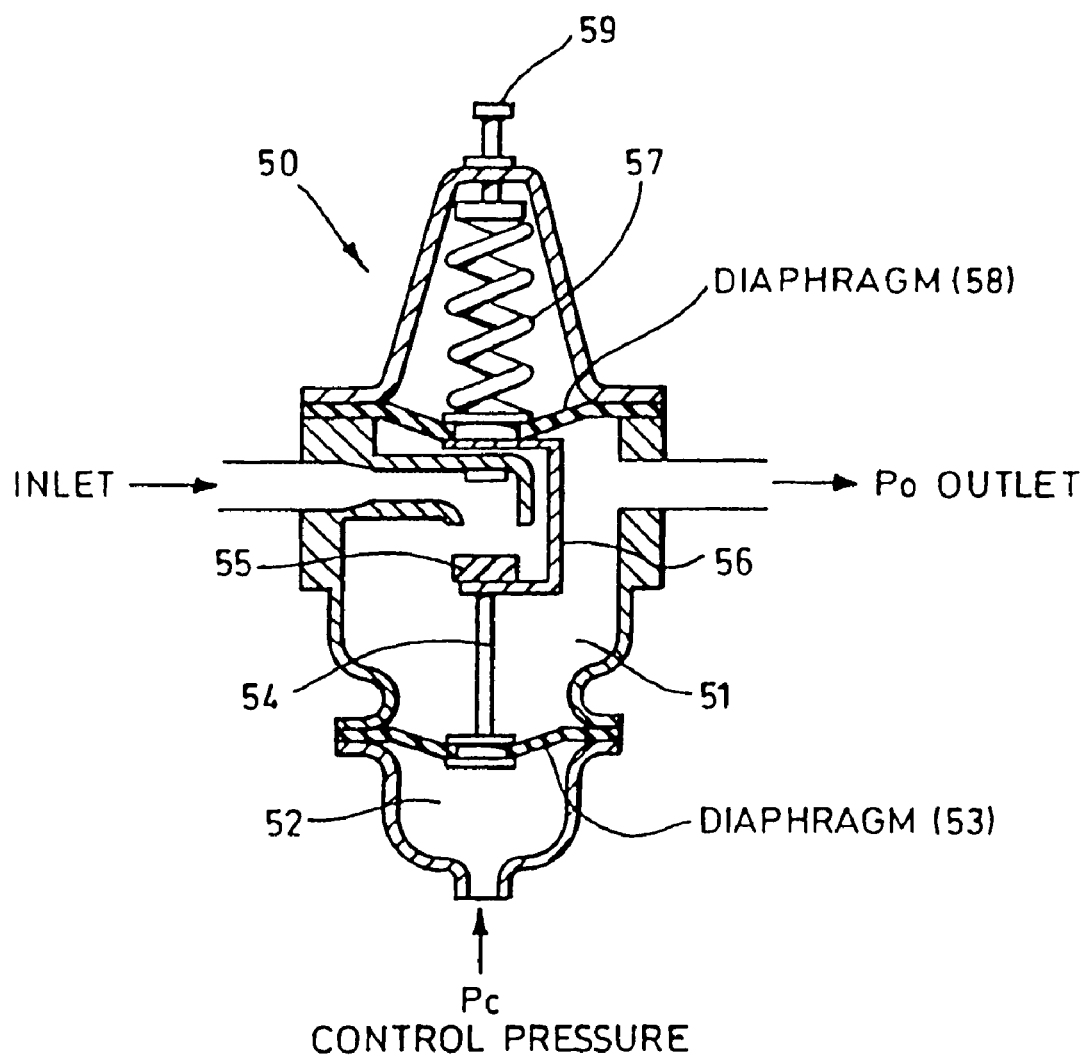
FIG. 5 is a schematic diagram of a pilot valve according to an embodiment of the present invention.

FIG. 5 shows a pilot valve 50 which includes a control chamber 51 and a second chamber 52. A control pressure Pc is applied to chamber 52 in use and chamber 52 is divided from control chamber 51 by a second chamber diaphragm 53.

The second chamber diaphragm 53 is rigidly connected via linkage 54 to a gate mechanism 55. The gate mechanism 55 is also connected via a further rigid linkage 56 to a spring 57. The spring 57 is isolated from the control chamber 51 by the control chamber diaphragm 58. The action of the force of the spring 57 on the diaphragm 58 may be adjusted by adjustment screw 59.

As can be seen from FIG. 5, the control fluid (which may be gas or water) present in the control chamber 51 acts against the opposite side of the second chamber diaphragm 53 to the control pressure Pc. In operation, if, for example, control pressure Pc is reduced then the gate 55 will open further causing the fluid flow through the control chamber to increase. When used in a PRV control circuit, as explained previously, this will cause the outlet pressure to increase.

As indicated in FIG. 5, the area of the control chamber diaphragm 58 is designated A and the area of the second chamber diaphragm 53 is designated as A'. The balance of forces operating in the pilot valve is as follows:

$$SF = APo - A'Po + A'Pc$$
$$= (A - A')Po + A'Pc$$

In a first example, if $A' = \frac{1}{2}A$ $$SF = A'(Po + Pc)$$

If a "multiplication" effect is required then the relative cross-section areas can be set to a different value. In a second example, if $A' = \frac{3}{4}A$, the equation will be $$SF = \frac{1}{4}A(Po + 3PC)$$

Therefore an increase of Pc of a given amount would cause Po to decrease by three times the amount and vice versa.

The above embodiment is given by way of example only and variations will be apparent to those skilled in the art.

What is claimed is:

1. A pilot valve for use in controlling a pressure reducing valve of a water supply system, said valve comprising:
    biasing means to control a gate for controlling water flow through a control chamber having an outlet connectable so that water pressure at the outlet is substantially equal to the outlet pressure of the pressure reducing valve being controlled;
    a second chamber being isolated from fluid communication with said control chamber and with the pressure reducing valve being controlled is sealed by a second chamber diaphragm into which control gas pressure is applicable for also controlling the operation of the gate, whereby, in use, an increase in control gas pressure acts to reduce water flow through the gate; the control gas pressure is different from the outlet pressure of the pressure reducing valve being controlled; and wherein the side of the diaphragm against which the control pressure is not applied, is in fluid communication with the control chamber.

2. A pilot valve according to claim 1 wherein said biasing means is biased to open said gate.

3. A pilot valve according to claim 2 wherein said biasing means is rigidly connected to said gate by a mechanical linkage.

4. A pilot valve according to claim 3 wherein the diaphragm is rigidly connected to said biasing means via a mechanical linkage.

5. A pilot valve according to claim 1 wherein said biasing means is a spring means.

6. A pilot valve according to claim 5 wherein said spring means is a helical spring.

7. A pilot valve according to claim 1 further including a control chamber diaphragm.

8. A pilot valve according to claim 1 wherein said biasing means is located on the opposite side of said control chamber diaphragm to said control chamber.

9. A pilot valve according to claim 7 wherein the ratio of the area of said control chamber diagram to said second chamber diaphragm is 2:1 or less.

10. A pilot valve according to claim 7 wherein the ratio of the area of said control chamber diagram to said second chamber diaphragm is 4:3 or less, so that in use, an increase of the control gas pressure by a given amount causes the outlet pressure to decrease by three or more times that amount.

11. A pilot valve for use in controlling a pressure reducing valve in a water supply system, said valve comprising:
biasing means to control a gate for controlling water flow through a control chamber having an outlet connectable so that water pressure at the outlet is substantially equal to the outlet pressure of the pressure reducing valve being controlled;
a second chamber being isolated from fluid communication with said control chamber and with the pressure reducing valve being controlled is sealed by a second chamber diaphragm into which control pressure is applicable for also controlling the operation of the gate, whereby, in use, an increase in control pressure acts to reduce water flow through the gate; the control pressure is different from the outlet pressure of the pressure reducing valve being controlled;
wherein the side of the diaphragm against which the control pressure is not applied, is in fluid communication with the control chamber;
wherein the biasing means is biased to open the gate and is rigidly connected to the gate by a mechanical linkage;
wherein the diaphragm is rigidly connected to the gate and the biasing means by a mechanical linkage; and
further including a control chamber diaphragm wherein said biasing means is located on the opposite side of the control chamber diaphragm to the control chamber.

12. A pilot valve for use in controlling a pressure reducing valve of a water supply system, said pilot valve comprising
biasing means to control a gate for controlling water flow through a control chamber having an outlet connectable so that water pressure at the outlet is substantially equal to the outlet pressure of the pressure reducing valve being controlled;
a second chamber being isolated from fluid communication with said control chamber and with the pressure reducing valve being controlled is sealed by a second chamber diaphragm into which control pressure is applicable for also controlling the operation of the gate, whereby, in use, an increase in control pressure acts to reduce water flow through the gate; the control pressure is different from the outlet pressure of the pressure reducing valve being controlled;
wherein the side of the diaphragm against which the control pressure is not applied is in fluid communication with the control chamber; and
wherein the control chamber is at least partly bounded by a control chamber diaphragm in addition to the second chamber diaphragm and the biasing means is isolated from the control chamber by said control chamber diaphragm.

13. Pressure controlling apparatus including a pilot valve and a pressure reducing valve for a water supply system, said pilot valve controlling said pressure reducing valve, wherein said pilot valve comprises biasing means to control a gate for controlling water flow through a control chamber having an outlet connected so that in use water pressure at the outlet is substantially equal to the outlet pressure of the pressure reducing valve;
a second chamber being isolated from fluid communication with said control chamber and with the pressure reducing valve being controlled is sealed by a second chamber diaphragm into which control pressure is applicable for also controlling the operation of the gate, whereby, in use, an increase in control pressure acts to reduce water flow through the gate and the pressure reducing valve; the control pressure is different from the outlet pressure of the pressure reducing valve;
wherein the side of the diaphragm against which the control pressure is not applied, is in fluid communication with the control chamber.

14. Pressure controlling apparatus including a pilot valve and a pressure reducing valve for a water supply system, said pilot valve controlling said pressure reducing valve, wherein said pilot valve comprises
biasing means to control a gate for controlling water flow through a control chamber having an outlet connected so that in use water pressure at the outlet is substantially equal to the outlet pressure of the pressure reducing valve;
a second chamber being isolated from fluid communication with said control chamber and with the pressure reducing valve being controlled is sealed by a second chamber diaphragm into which control pressure is applicable for also controlling the operation of the gate, whereby, in use, an increase in control pressure acts to reduce water flow through the gate and the pressure reducing valve; the control pressure is different from the outlet pressure of the pressure reducing valve;
wherein the side of the diaphragm against which the control pressure is not applied, is in fluid communication with the control chamber; and
the control chamber is at least partly bounded by a control chamber diaphragm in addition to the second chamber diaphragm and the biasing means is isolated from the control chamber by said control chamber diaphragm.

15. Pressure controlling apparatus including a pilot valve and a pressure reducing valve for a water supply system, said pilot valve controlling said pressure reducing valve, wherein said pilot valve comprises biasing means to control a gate for controlling water flow through a control chamber having an outlet connected so that in use water pressure at the outlet is substantially equal to the outlet pressure of the pressure reducing valve;

a second chamber being isolated from fluid communication with said control chamber and with the pressure reducing valve being controlled is sealed by a second chamber diaphragm into which control pressure is applicable for also controlling the operation of the gate, whereby, in use, an increase in control pressure acts to reduce water flow through the gate and the pressure reducing valve; the control pressure is different from the outlet pressure of the pressure reducing valve;

wherein the side of the diaphragm against which the control pressure is not applied is in fluid communication with the control chamber;

wherein the biasing means is biased to open the gate and is rigidly connected to the gate by a mechanical linkage;

further including a control chamber diaphragm; and wherein said biasing means is located on the opposite side of the control chamber diaphragm to the control chamber.

16. Pressure controlling apparatus including a pilot valve and a pressure reducing valve for a water supply system, said pilot valve controlling said pressure reducing valve, wherein said pilot valve comprises:

biasing means to control a gate for controlling water flow through a control chamber having an outlet connected so that in use water pressure at the outlet is substantially equal to the outlet pressure of the pressure reducing valve;

a second chamber being isolated from fluid communication with said control chamber and with the pressure reducing valve being controlled is sealed by a second chamber diaphragm into which control pressure is applicable for also controlling the operation of the gate, whereby, in use, an increase in control pressure acts to reduce water flow through the gate and the pressure reducing valve; the control pressure is different from the outlet pressure of the pressure reducing valve;

wherein the side of the diaphragm against which the control pressure is not applied, is in fluid communication with the control chamber;

wherein the biasing means is biased to open the gate and is rigidly connected to the gate by a mechanical linkage;

further including a control chamber diaphragm;

wherein said biasing means is located on the opposite side of the control chamber diaphragm to the control chamber; and wherein the ratio of the area of said control chamber diaphragm to said second chamber diaphragm is 2:1 or less.

17. A pilot valve for use in controlling a pressure reducing valve of a water supply system, said valve comprising:

biasing means to control a gate for controlling water flow through a control chamber having an outlet connectable so that water pressure at the outlet is substantially equal to the outlet pressure of the pressure reducing valve being controlled;

a second chamber being isolated from fluid communication with said control chamber and with the pressure reducing valve being controlled is sealed by a second chamber diaphragm into which control pressure is applicable for also controlling the operation of the gate, whereby, in use, an increase in control pressure acts to reduce water flow through the gate; the control pressure is different from the outlet pressure of the pressure reducing valve being controlled;;

wherein the side of the diaphragm against which the control pressure is not applied, is in fluid communication with the control chamber;

further including a control chamber diaphragm; and wherein the ratio of the area of said control chamber diagram to said second chamber diaphragm is 4:3 or less, so that in use, an increase of the control pressure by a given amount causes the outlet pressure to decrease by three or more times that amount.

18. A pilot valve for use in controlling a pressure reducing valve of a water supply system, said valve comprising:

biasing means to control a gate for controlling water flow through a control chamber having an outlet connectable so that water pressure at the outlet is substantially equal to the outlet pressure of the pressure reducing valve being controlled;

a second chamber being isolated from fluid communication with said control chamber and with the pressure reducing valve being controlled is sealed by a second chamber diaphragm into which control pressure is applicable for also controlling the operation of the gate, whereby, in use, an increase in control pressure acts to reduce water flow through the gate; the control pressure is different from the outlet pressure of the pressure reducing valve being controlled;

wherein the side of the diaphragm against which the control pressure is not applied, is in fluid communication with the control chamber; and wherein the control pressure is gas pressure.

19. Pressure controlling apparatus including a pilot valve and a pressure reducing valve for a water supply system, said pilot valve controlling said pressure reducing valve, wherein said pilot valve comprises:

biasing means to control a gate for controlling water flow through a control chamber having an outlet connected so that in use water pressure at the outlet is substantially equal to the outlet pressure of the pressure reducing valve;

a second chamber being isolated from fluid communication with said control chamber and with the pressure reducing valve being controlled is sealed by a second chamber diaphragm into which control pressure is applicable for also controlling the operation of the gate, whereby, in use, an increase in control pressure acts to reduce water flow through the gate and the pressure reducing valve; the control pressure is different from the outlet pressure of the pressure reducing valve;

wherein the side of the diaphragm against which the control pressure is not applied, is in fluid communication with the control chamber;

wherein the biasing means is biased to open the gate and is rigidly connected to the gate by a mechanical linkage;

further including a control chamber diaphragm;

wherein said biasing means is located on the opposite side of the control chamber diaphragm to the control chamber; and wherein the ratio of the area of said control chamber diagram to said second chamber diaphragm is 4:3 or less, so that in use, an increase of the control pressure by a given amount causes the outlet pressure to decrease by three or more times that amount.

20. Pressure controlling apparatus including a pilot valve and a pressure reducing valve for a water supply system, said pilot valve controlling said pressure reducing valve, wherein said pilot valve comprises
   biasing means to control a gate for controlling water flow through a control chamber having an outlet connected so that in use water pressure at the outlet is substantially equal to the outlet pressure of the pressure reducing valve;
   a second chamber being isolated from fluid communication with said control chamber and with the pressure reducing valve being controlled is sealed by a second chamber diaphragm into which control pressure is applicable for also controlling the operation of the gate, whereby, in use, an increase in control pressure acts to reduce water flow through the gate and the pressure reducing valve; the control pressure is different from the outlet pressure of the pressure reducing valve; wherein the side of the diaphragm against which the control pressure is not applied, is in fluid communication with the control chamber; and
   wherein the control pressure is gas pressure.

* * * * *